(12) United States Patent
Smith et al.

(10) Patent No.: US 8,528,189 B1
(45) Date of Patent: Sep. 10, 2013

(54) METHOD USING MODULAR VIBRATORY APPARATUS

(75) Inventors: Randy Smith, Cary, IL (US); Steve Massman, Poplar Grove, IL (US)

(73) Assignee: General Kinematics Corporation, Crystal Lake, IL (US)

( * ) Notice: Subject to any disclaimer, the term of this patent is extended or adjusted under 35 U.S.C. 154(b) by 629 days.

(21) Appl. No.: 12/573,092

(22) Filed: Oct. 2, 2009

Related U.S. Application Data

(60) Provisional application No. 61/102,657, filed on Oct. 3, 2008.

(51) Int. Cl.
*B23P 11/00* (2006.01)
(52) U.S. Cl.
USPC ................................... 29/525.02
(58) Field of Classification Search
USPC .............. 29/525.02, 469, 428, 426.1, 821
See application file for complete search history.

(56) References Cited

U.S. PATENT DOCUMENTS 4,212,406 A * 7/1980 Mittelmann ............... 220/1.5
4,907,753 A * 3/1990 Bohringer ............... 241/285.1

FOREIGN PATENT DOCUMENTS

CN 101011694 * 8/2007

* cited by examiner

*Primary Examiner* — John C Hong
(74) *Attorney, Agent, or Firm* — Marshall, Gerstein & Borun LLP

(57) ABSTRACT

A method of installing a vibratory conveyor into a confined space includes fabricating a modular vibratory apparatus as individual subassemblies, comprising at least first and second side wall subassemblies, first and second end wall subassemblies, at least one cross-member subassembly, a mounting bracket subassembly, a drive subassembly, and a liner subassembly. The method also includes transporting the individual subassemblies to an installation site as separate subassemblies, and attaching the individual subassemblies to each other to define an assembled modular vibratory apparatus using a bolting technique at the installation site.

7 Claims, 2 Drawing Sheets

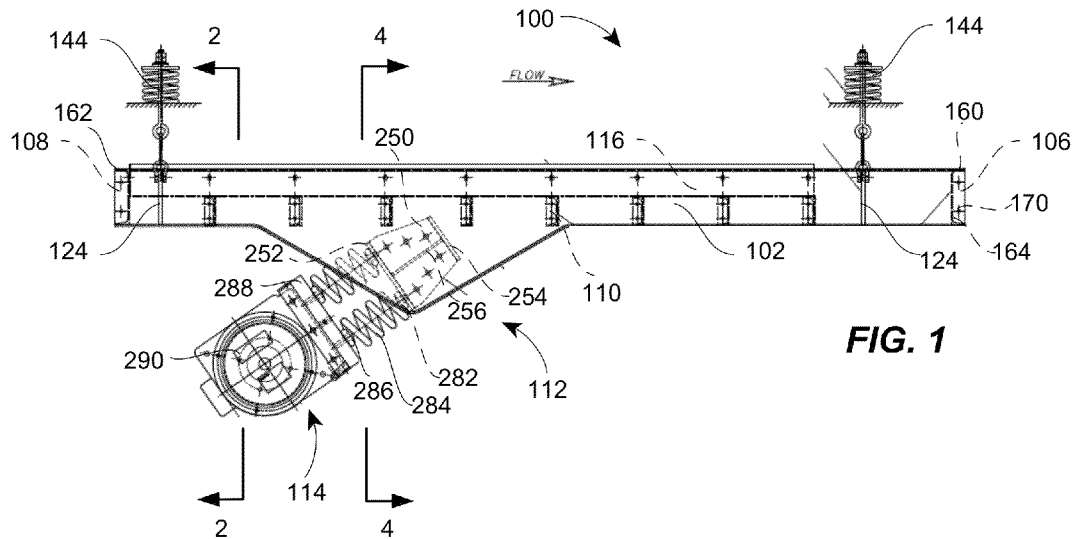

METHOD USING MODULAR VIBRATORY APPARATUS

This application claims the benefit of U.S. patent application Ser. No. 61/102,657, filed Oct. 3, 2008, which is hereby incorporated by reference in its entirety in the present application.

BACKGROUND

This patent is directed to a method using a vibratory apparatus, and, in particular, to a method using a modular vibratory apparatus in confined and/or hazardous installation sites, for example.

Vibratory conveyors are frequently used to transport materials from one place to another. In particular, vibratory conveyors are often used where large volumes of material are transported from one location to another. For example, vibratory conveyors may be used to move coal, ore and rock in mining applications from the mining site to the processing site.

Given the conditions under which these conveyors may be used, as well as the volumes of material moved using these conveyors, it will be recognized that wear to the equipment will occur. At some point, the wear may require repair, either because an element of the conveyor fails, or preventive maintenance schedules require its replacement. Given the size and weight of the conveyors, it is not possible to simply remove the conveyor from where it is installed and service it elsewhere.

Conventionally, vibratory conveyors include a number of parts, many of which are welded to each other. For example, the deck may be welded to the side plates, as may the mounting bracket for the vibratory generator. Consequently, to repair the deck or the vibratory generator, it may be necessary to first cut the deck or mounting bracket out and then weld a replacement in place.

However, in a hazardous duty applications, such as in mining applications, cutting and welding operations may require significant time and expense. Given the potential for fire or explosion, the cutting and welding operations must be conducted according to sophisticated guidelines, so as to minimize the risk to the mine and the repair crew. These guidelines require substantial preparation time on the part of the repair crew. These guidelines also may require that the section of the mine in which the equipment is installed be shut down for some period of time before, during and after the time the repairs are complete.

Even when the conveyor is not used in a hazardous duty application, the time and expense of repairing a vibratory conveyor may be considerable given the installation site of the conveyor. For example, the conveyor may be installed in and amongst other large pieces of equipment, with other pieces of equipment were not installed prior to the delivery of the vibratory conveyor at the work site or plant. In such a setting, the cost and expense may not be so much a factor of the guidelines that must be complied with to permit the repair to occur, but to prevent the repair from damaging the surrounding equipment. In such a setting, the time and expense required may be just as substantial as in a hazardous duty application.

SUMMARY

According to an aspect of the present disclosure, method of installing a vibratory conveyor into a confined space is provided. The method includes fabricating a modular vibratory apparatus as individual subassemblies, comprising at least first and second side wall subassemblies, first and second end wall subassemblies, at least one cross-member subassembly, a mounting bracket subassembly, a drive subassembly, and a liner subassembly. The method also includes transporting the individual subassemblies to an installation site as separate subassemblies, and attaching the individual subassemblies to each other to define an assembled modular vibratory apparatus using a bolting technique at the installation site.

BRIEF DESCRIPTION OF THE DRAWINGS

It is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

FIG. 1 is a side view of an assembled modular vibratory apparatus according to the present disclosure;

FIG. 2 is an exploded, cross-sectional view of the modular vibratory apparatus of FIG. 1 taken about line 2-2;

FIG. 4 is an exploded, cross-sectional view of the modular vibratory apparatus of FIG. 1 taken about line 4-4.

DETAILED DESCRIPTION OF VARIOUS EMBODIMENTS

Figure 3:
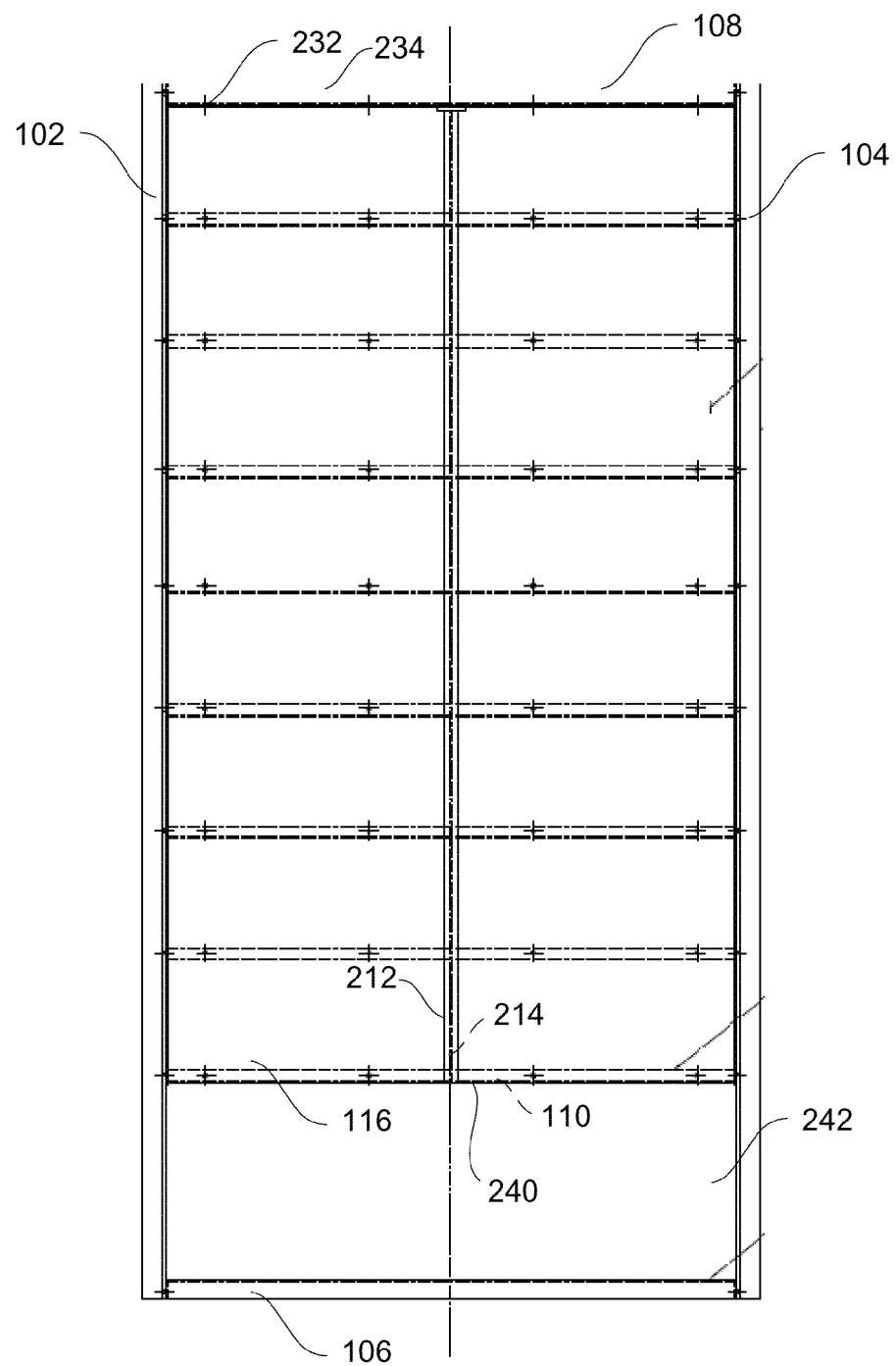
FIG. 3 is a plan view of the modular vibratory apparatus of FIG. 1.

Although the following text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

A modular vibratory apparatus 100 is illustrated in FIGS. 1 and 3 as assembled, and in FIGS. 2 and 4 prior to assembly.

The modular vibratory apparatus 100 may be used as a conveyor or a feeder, for example.

The apparatus 100 is assembled from a number of subassemblies, which subassemblies may be fabricated by welding or bolting individual pieces or further subassemblies together. However, according to the present disclosure, the subassemblies that define the apparatus 100 are transported separately to the installation site, and then bolted together at the installation site. As a consequence, no welding is required for assembly at the installation site, but neither is it necessary to attempt to transport the apparatus 100 already assembled to the installation site.

The apparatus 100 includes at least the following subassemblies: first and second side wall subassemblies 102, 104, first and second end wall subassemblies 106, 108, at least one cross-member subassembly 110, a mounting bracket subassembly 112, a drive subassembly 114 and a liner subassembly 116. Each subassembly is attached to at least one of the other subassemblies by bolting the subassemblies together. The bolting may be performed using conventional bolts, or the bolting may take the form of huck bolting instead.

As best seen in FIG. 2, the side wall subassemblies 102, 104 include side walls 120, 122 to which mounting brackets 124, 126 have been attached. The mounting brackets 124, 126, which may be roughly triangular in shape, may be welded to the side walls 120, 122. Each mounting bracket 124, 126 may have an opening 128, 130 through which a ring 132, 134 may be passed. The ring 132, 134 is attached to a plate 136, 138 that is disposed at a first end 140, 142 of a resilient member 144, 146, which may be a coil spring, for example. A second end 148, 150 of the resilient member 144, 146 abuts a support surface. The resilient members 144, 146, which may be referred to as isolation springs, serve to minimize the effects of the apparatus 100 on the surrounding environment.

It will be recognized that the arrangement of mounting brackets and resilient members is an exemplary one. Other arrangements are also within the scope of the present disclosure.

The side wall subassemblies 102, 104 are connected to the end wall subassemblies 106, 108 and the cross-member subassemblies 110. In particular, the end wall subassemblies 106, 108 may be defined by a U-shaped channel 160, 162, to which end plates 164 (only one of which is illustrated in FIG. 1) have been attached, by welding for example. The end plates 164 may have one or more apertures 170 defined therethrough to accept a bolt so as to be bolted or huck bolted to the side wall subassemblies 102, 104 (also illustrated in FIGS. 1 and 4). Similarly, the cross-member subassemblies 110 may be defined by a U-shaped channel 180 to which end plates 182, 184 (as best seen in FIG. 2) have been attached, by welding for example. The end plates 182, 184 have one or more apertures 186, 188 defined therethrough to accept a bolt so as to be bolted or huck bolted to the side wall subassemblies 102, 104 (also illustrated in FIGS. 1 and 4).

The liner subassembly 116 may in turn be connected to the side wall subassemblies 102, 104, the cross-member subassemblies 110 and the end wall subassembly 108. The liner subassembly 116 may include first and second liner sections 200, 202, which may be fabricated separately and assembled at the installation site. Each section 200, 202 includes a planar bottom wall 204, 206 and an upturned side wall 208, 210 that is approximately ninety degrees relative to the bottom wall 204, 206. The bottom wall 206 of one of the sections 202 may have a bridge or bridging piece 212 attached thereto, which bridge 212 covers a seam 214 (see FIG. 4) between the sections 200, 202 so as to limit access to the seam 214.

The bottom walls 204, 206 and the side walls 208, 210 have apertures or openings 220, 222, 224, 226 formed therethrough. The apertures 220, 222 in the bottom walls may be aligned with apertures or openings 228 in a first wall 230 of the cross-member subassemblies 110 (in particular, the channel 180 that in part defines the subassemblies 110), as also seen in FIG. 3. Certain of the apertures 220, 222 may also be aligned with apertures or openings 232 in a first wall 234 of the end wall subassembly 108, as seen in FIG. 3. The apertures 224, 226 of the side walls 208, 210 may be aligned with apertures or openings 236, 238 in the side wall subassemblies 102, 104, as also seen in FIG. 1. Bolts may be disposed through the aligned apertures 220, 222, 224, 226, 232, 236, 238 to bolt or to huck bolt the liner subassembly 116 to the side wall subassemblies 102, 104, the end wall subassembly 108 and the cross-member subassemblies 110.

It will be noted, with reference to FIG. 3, that the end wall subassembly 106 is spaced from an edge 240 of the liner subassembly 116. As a consequence, a drop-out opening 242 is defined between the edge 240 and the end wall subassembly 106, and the side wall subassemblies 102, 104. Material that is received on the liner subassembly 116 may exit through this opening 242.

As seen in FIGS. 1 and 4, the bracket subassembly 112 may include an I-shaped beam 250 having a pair of flanges 252, 254 and a web 256 joining the flanges 252, 254. As best seen in FIG. 4, a pair of end plates 258, 260 are attached to the beam 250 at either end 262, 264. The end plates 258, 260 each have a plurality of apertures or openings 266, 268 formed therethrough, which apertures 266, 268 are aligned with apertures or openings 270, 272 formed in the side wall subassemblies 102, 104, and in particular the side walls 120, 122. Bolts may be disposed through the apertures 266, 268, 270, 272 to bolt or huck bolt the bracket subassembly 112 to the side wall subassemblies 102, 104.

As seen in FIG. 4, at least one of the flanges 252 of the beam 250 has a plurality of apertures 280 formed therethrough. The apertures 280 are used to attach a first end 282 of a resilient member 284 to the spring bracket subassembly 112, as seen in FIG. 1. The resilient member 284 may define, in part, the drive subassembly 114. The resilient member 284, which may be a coil spring, may be referred to as a reactor spring. The other end 286 of the resilient member 284 is attached to an exciter 288, which may include an electric motor 290 that has a shaft with at least one eccentric weight attached.

While one drive subassembly 114 has been described, it will be understood that other drive subassemblies are within the scope of the present disclosure. For example, the motor 290 may be attached directly to the mounting bracket subassembly 112 in a "brute force"-type installation. Alternatively, pneumatic or hydraulic units may be substituted for the motor 290. Still other alternatives will occur to the skilled practitioner.

The modular vibratory apparatus as described above may be advantageously used in a method of installing a vibratory conveyor into a confined space. In particular, such a method may include fabricating a modular vibratory apparatus as individual subassemblies, comprising at least first and second side wall subassemblies, first and second end wall subassemblies, at least one cross-member subassembly, a mounting bracket subassembly, a drive subassembly, and a liner subassembly. In regard to fabrication, this may include such actions as cutting metal channels or plates to define the individual subassemblies or elements of the subassemblies, forming apertures or openings in the channels or plates, and attaching the elements together, for example by welding the elements to the subassemblies together.

The method may also include transporting the individual subassemblies to an installation site as separate subassemblies. For example, the individual subassemblies may be transported into a mine shaft as separate subassemblies. Alternatively, the individual subassemblies may be transported into an installation space beneath a hopper. Still other possibilities will be recognized, wherein the size of the individual subassemblies permits placement in an installation site bounded by existing obstacles or the path to the installation site is confined (such as is the case in a mine shaft, for example).

Once the individual subassemblies have been transported to the installation site, certain optional preparatory actions may need to be taken. For example, a vibratory apparatus may already be disposed in the installation site. This would not be an uncommon occurrence where the modular vibratory apparatus is being installed to improve ease of servicing and repair at a work site or plant. Thus, the method may include disassembling the existing vibratory apparatus at the installation site prior to proceeding to the next step.

Further, the method may include attaching the individual subassemblies to each other to define an assembled modular vibratory apparatus using a bolting technique at the installation site. For example, the individual subassemblies may be attached to each other using bolt and nut combinations. Alternatively, the individual subassemblies may be attached to each other using a huck bolting technique. It is not intended for the individual subassemblies to be welded together to define the assembled modular vibratory apparatus. As a consequence, the apparatus and method according to the present disclosure are particularly well-suited for installations sites where welding would be difficult to perform without significant cost or significant hazard to health and safety, if a welding technique were used instead.

The method may advantageously include further actions related to service and repair (or even complete replacement) of the modular vibratory apparatus taking advantage of the modular design and the bolting techniques used to attach the individual subassemblies to each other. For example, the method may include disassembling at least one of the individual subassemblies from the assembled modular vibratory apparatus, and then attaching a replacement subassembly for the at least one of the individual subassemblies using a bolting technique at the installation site. Extending this action further, it may be possible to disassemble all of the individual subassemblies from each other, and remove the assembled modular vibratory apparatus from the installation site.

It is believed that the present disclosure may have several benefits, one or more of which may be present in a particular embodiment according to the present disclosure.

We claim:

1. A method of installing a vibratory conveyor into a confined space, comprising:
   fabricating a modular vibratory apparatus as individual subassemblies, comprising at least first and second side wall subassemblies, first and second end wall subassemblies, at least one cross-member subassembly, a mounting bracket subassembly, a drive subassembly, and a liner subassembly;
   transporting the individual subassemblies to an installation site as separate subassemblies; and
   attaching the individual subassemblies to each other to define an assembled modular vibratory apparatus using a bolting technique at the installation site.

2. The method according to claim 1, comprising disassembling an existing vibratory apparatus at the installation site prior to attaching the individual subassemblies to each other using a bolting technique at the installation site.

3. The method according to claim 1, comprising disassembling at least one of the individual subassemblies from the assembled modular vibratory apparatus, and attaching a replacement subassembly for the at least one of the individual subassemblies using a bolting technique at the installation site.

4. The method according to claim 1, wherein attaching the individual subassemblies to each other comprises attaching the subassemblies using bolt and nut combinations.

5. The method according to claim 1, wherein attaching the individual subassemblies to each other comprises attaching the subassemblies using a huck bolting technique.

6. The method according to claim 1, wherein transporting the individual subassemblies comprises transporting the individual subassemblies into a mine shaft as separate subassemblies, and attaching the individual subassemblies comprises attaching the individual subassemblies in the mine shaft using a huck bolting technique.

7. The method according to claim 1, wherein transporting the individual subassemblies comprises transporting the individual subassemblies into a installation space beneath a hopper, and attaching the individual subassemblies comprises attaching the individual subassemblies under the hopper to define an assembled modular vibratory apparatus using a bolting technique under the hopper.

* * * * *